(12) United States Patent
Tanaka et al.

(10) Patent No.: US 9,167,183 B2
(45) Date of Patent: Oct. 20, 2015

(54) IMAGING ELEMENT AND IMAGING APPARATUS EMPLOYING PHASE DIFFERENCE DETECTION PIXELS PAIRS

(71) Applicant: FUJIFILM Corporation, Tokyo (JP)

(72) Inventors: Seiji Tanaka, Saitama (JP); Yoichi Iwasaki, Saitama (JP); Hiroshi Endo, Saitama (JP); Takashi Aoki, Saitama (JP); Kazuki Inoue, Saitama (JP); Kenkichi Hayashi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/318,121

(22) Filed: Jun. 27, 2014

(65) Prior Publication Data

US 2014/0307139 A1 Oct. 16, 2014

Related U.S. Application Data

(63) Continuation of application No. PCT/JP2012/082385, filed on Dec. 13, 2012.

(30) Foreign Application Priority Data

Dec. 28, 2011 (JP) .................................. 2011-288033

(51) Int. Cl.
*H04N 5/232* (2006.01)
*H04N 5/357* (2011.01)
(Continued)

(52) U.S. Cl.
CPC ........... *H04N 5/357* (2013.01); *H04N 5/23212* (2013.01); *H04N 5/3696* (2013.01); *H04N 5/374* (2013.01); *H04N 9/04* (2013.01)

(58) Field of Classification Search
CPC ................................................ H04N 5/23212

USPC .......................................................... 348/349
See application file for complete search history.

(56) References Cited

U.S. PATENT DOCUMENTS

| | | |
|---|---|---|
| 5,889,554 A | 3/1999 | Mutze |
| 2009/0200451 A1 | 8/2009 | Conners |

(Continued)

FOREIGN PATENT DOCUMENTS

| | | |
|---|---|---|
| EP | 1 793 620 A1 | 6/2007 |
| JP | H02-210996 A | 8/1990 |

(Continued)

OTHER PUBLICATIONS

International Search Report issued in PCT/JP2012/082385, mailed on Feb. 26, 2013.

(Continued)

*Primary Examiner* — Gary C Vieaux
(74) *Attorney, Agent, or Firm* — Birch, Stewart, Kolasch & Birch, LLP

(57) ABSTRACT

It is an imaging element in which pixels which are photoelectric conversion elements are placed at respective square lattice positions, in which, when, in a predetermined region where pixels of the imaging element are placed, a plurality of pairs are arranged in a first line which is any one line among lines and a second line which is parallel to the first line, each pair having pair pixels which are first and second phase difference detection pixels placed adjacent to each other to detect a phase difference among the pixels of the imaging element, the pairs in the first line are placed to be spaced apart from each other by at least two pixels, and the pairs in the second line are placed at positions, which correspond to positions where the pair pixels in the first line are spaced apart from each other.

14 Claims, 15 Drawing Sheets

(51) Int. Cl.
*H04N 5/369* (2011.01)
*H04N 9/04* (2006.01)
*H04N 5/374* (2011.01)

(56) References Cited

U.S. PATENT DOCUMENTS

| | | | |
|---|---|---|---|
| 2010/0091161 A1* | 4/2010 | Suzuki | 348/302 |
| 2011/0076001 A1 | 3/2011 | Iwasaki | |
| 2011/0249156 A1 | 10/2011 | Goto | |

FOREIGN PATENT DOCUMENTS

| | | | |
|---|---|---|---|
| JP | 2010-258912 A | 11/2010 |
| JP | 2010-288083 A | 12/2010 |
| JP | 2011-77829 A | 4/2011 |
| JP | 2011-81201 A | 4/2011 |
| JP | 2011-221290 A | 11/2011 |
| JP | 2011-245214 A | 12/2011 |
| JP | 2011-252955 A | 12/2011 |

OTHER PUBLICATIONS

Extended European Search Report, dated Aug. 4, 2014, in related application No. EP11859479.5.
Extended European Search Report, dated Jan. 27, 2015, in related application No. EP12804973.1.
Extended European Search Report, dated Oct. 28, 2014, in related application No. EP11859950.5.
Hirakawa & Wolfe, "Spatio-Spectral Color Filter Array Design for Optimal Image Recovery," IEEE Transactions on Image Processing 17:10:1876-1890 (Oct. 2008).

* cited by examiner

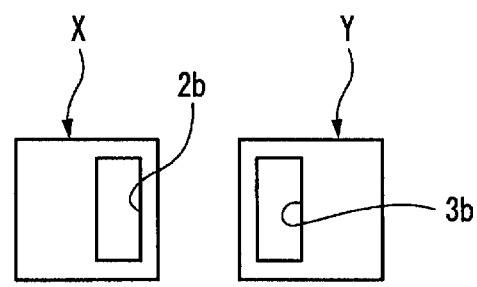
FIG. 4A
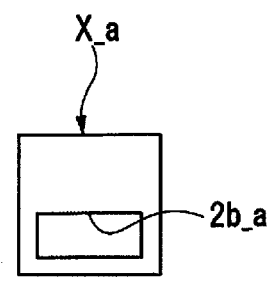
FIG. 4B
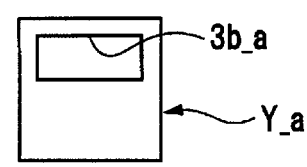

FIG. 5A

| | | | | | | | | | | | |
|---|---|---|---|---|---|---|---|---|---|---|---|
| | | | | | | | | | | | |
| X | X | X | X | X | X | X | X | X | X | X | X |
| Y | Y | Y | Y | Y | Y | Y | Y | Y | Y | Y | Y |
| | | | | | | | | | | | |

FIG. 5B

| | | | | | | | | | | | | |
|---|---|---|---|---|---|---|---|---|---|---|---|---|
| X | | X | | X | | X | | X | | X | | ← 51 |
| Y | | Y | | Y | | Y | | Y | | Y | | ← 52 |
| | X | | X | | X | | X | | X | | X | ← 53 |
| | Y | | Y | | Y | | Y | | Y | | Y | ← 54 |
| | | | | | | | | | | | | |

|   | B | R |   |   | B | R |   |
|---|---|---|---|---|---|---|---|
| B |   |   | B | R |   |   | B |
| R |   |   | R | B |   |   | R |
|   | B | R |   |   | B | R |   |
| Y | R | B | X | Y | R | B | X |
| B |   |   | B | R |   |   | B |
| R | X | Y | R | B | X | Y | R |
|   | B | R |   |   | B | R |   |

FIG. 13

IMAGING ELEMENT AND IMAGING APPARATUS EMPLOYING PHASE DIFFERENCE DETECTION PIXELS PAIRS

CROSS REFERENCE TO RELATED APPLICATION

This is a continuation of International Application No. PCT/JP2012/082385 filed on Dec. 13, 2012, and claims priority from Japanese Patent Application No. 2011-288033, filed on Dec. 28, 2011, the entire disclosures of which are incorporated herein by reference.

BACKGROUND

1. Technical Field

The present invention relates to an imaging element having a phase difference detection pixel and an imaging apparatus equipped with the imaging element.

2. Related Art

An imaging element such as a CCD type or a CMOS type is configured by arraying pixels, which are photoelectric conversion elements, in a 2D array pattern. FIG. 14A illustrates a plan view of 1 pixel and a light blocking layer 1a is stacked on a rectangular photoelectric conversion element (photodiode, hereinafter, referred to as a pixel) 1 and an opening 1b is provided in the light blocking layer 1a. The opening 1b is formed widely such that a light receiving surface of the pixel 1 may not be covered if possible so as to receive a large amount of light.

The plurality of such pixels 1 is arrayed on a surface of a semiconductor board in the 2D array pattern. However, an imaging element in which a phase difference detection pixel coexists in an array of pixels 1 that captures a subject image has been recently proposed and applied to an actual device.

FIG. 14B is a plan view of one example of a phase difference detection pixel. In a phase difference detection pixel 2, a light blocking layer opening 2b which is narrower than the opening 1b of FIG. 14A is provided to be eccentric to the right with respect to a center of the pixel. In a phase difference detection pixel 3, a narrow light blocking layer opening 3b having the same size as the light blocking layer opening 2b is provided to be eccentric to the left with respect to the center of the pixel.

A pair of the phase difference detection pixels 2 and 3 in which the light blocking layer openings 2b and 3b are displaced horizontally are used to acquire left-right-direction, that is, horizontal incident light phase difference information. In addition, when the phase difference detection pixel pair is arranged horizontally in an imaging element, a horizontal distribution of the phase difference information may be acquired and for example, a focus distance up to a subject may be detected from the distribution information. As a result, the phase difference detection pixels 2 and 3 are used as focus detecting pixels in Patent Literature 1 (JP-A-2011-252955) and Patent Literature 2 (JP-A-2011-242514).

FIG. 15 is a view describing a layout of the phase difference detection pixels disclosed in Patent Literatures 1 and 2. Light blocking layer openings of pixels (referred to as ordinary pixels) other than the phase difference detection pixels are not illustrated. In an imaging element 5 in the related art, ordinary pixels 1 are arrayed in a square lattice shape and all pixels for 1 row within a predetermined range among the ordinary pixels 1 become pairs of the phase difference detection pixels 2 and 3.

When all the pixels for 1 row become the phase difference detection pixel pairs as described above, it is advantageous in that a horizontal resolution of the detected phase difference information is increased.

Although a description has been made above on an example in which the phase difference pixel pair is configured by making the narrow light blocking layer openings 2b and 3b be eccentric to the center of the pixel, one ellipsoidal microlens may be mounted with respect to 2 pixels adjacent to the ordinary pixels 1 to be pupil-divided, which become the phase difference pixel pair.

SUMMARY OF INVENTION

Like the related art illustrated in FIG. 15, all pixels for 1 row become the phase difference detection pixels to acquire distribution data of phase difference information having a high resolution in a horizontal direction. However, on the other hand, a problem also occurs. Since a phase difference detection pixel is configured to receive a smaller amount of light than the ordinary pixel 1 and thither, to have a phase difference, a subject-captured captured image signal at a pixel position of the phase difference detection pixel is generally acquired by interpolation-operating the captured image signal of the neighboring ordinary pixel. That is, the phase difference detection pixel is handled in the same manner as a defective pixel in regard to imaging a subject.

In the imaging element 5 illustrated in FIG. 15, one pixel row is formed, in which the phase difference detection pixels 2 and 3 are compactly filled horizontally without a gap (a gap for one pixel is not provided between the pairs of phase difference detection pixels). As a result, the captured image signals at the pixel positions of the phase difference detection pixels 2 and 3 are interpolation-operated by using the captured image signals of the vertical ordinary pixels of the pixel row.

In the case of FIG. 15, since no ordinary pixel 1 is present at a pixel row position (vertical position) where the phase difference detection pixels 2 and 3 are provided, interpolation-operation is performed without using the captured image signal at the vertical position. As a result, precision of the interpolation-operation is sacrificed and an image quality for 1 row deteriorates.

An illustrative aspect of the present invention is to provide an imaging element and an imaging apparatus that can improve interpolation precision of a captured image signal while maintaining a resolution in a direction to detect phase difference information to be high.

According to an aspect of the present invention, it is an imaging element in which pixels which are photoelectric conversion elements are placed at respective square lattice positions where a plurality of horizontal lines and a plurality of vertical lines cross each other, in which, when, in a predetermined region where pixels of the imaging element are placed, a plurality of pairs are arranged in a first line which is any one line among the lines and a second line which is parallel to the first line, each pair having pair pixels which are first and second phase difference detection pixels placed adjacent to each other, the first and second phase difference detection pixels are phase difference detection pixels detecting a phase difference among the pixels of the imaging element, the pairs in the first line are placed to be spaced apart from each other by at least two pixels, and the pairs in the second line are placed at positions, which correspond to positions where the pair pixels in the first line are spaced apart from each other.

According to another aspect of the present invention, it is an imaging apparatus equipped with the imaging element of claim 1, the imaging apparatus comprising: a pixel interpolating unit that obtains a captured image signal at a position of a phase difference detection pixel by pixel-interpolating captured image signals of pixels other than the phase difference detection pixel, adjacent to the phase difference detection pixel.

According to the present invention, since phase difference detection pixels do not become all pixels on one horizontal line and all pixels on one vertical line, captured image signals at pixel positions of the phase difference detection pixels may be pixel-interpolated with high precision, so that a subject image having a high quality can be obtained.

BRIEF DESCRIPTION OF DRAWINGS

FIGS. 4A and 4B are views describing a layout of a phase difference detection pixel pair.

FIGS. 5A and 5B are views illustrating phase difference detection pixel layouts according to a conventional example (FIG. 5A) and a fourth exemplary embodiment (FIG. 5B) of the present invention.

FIGS. 8A to 8D are explanatory views in which the first and second exemplary embodiments are applied in a Bayer array.

FIGS. 9A to 9C are views describing an example in which phase difference detection pixels are provided in a color filter array different from that of FIGS. 8A to 8D.

FIGS. 10A to 10C are views describing an example in which phase difference detection pixels are provided in a color filter array different from that of FIGS. 9A to 9C.

FIGS. 11A and 11B are views describing an example in which phase difference detection pixels are provided in another color filter array.

FIG. 12 is a view describing an example in which phase difference detection pixels are provided in another color filter array.

FIG. 13 is a view describing an example in which phase difference detection pixels are provided in another color filter array.

DESCRIPTION OF EMBODIMENTS

Hereinafter, exemplary embodiments of the present invention will be described with reference to the accompanying drawings.

Figure 1:
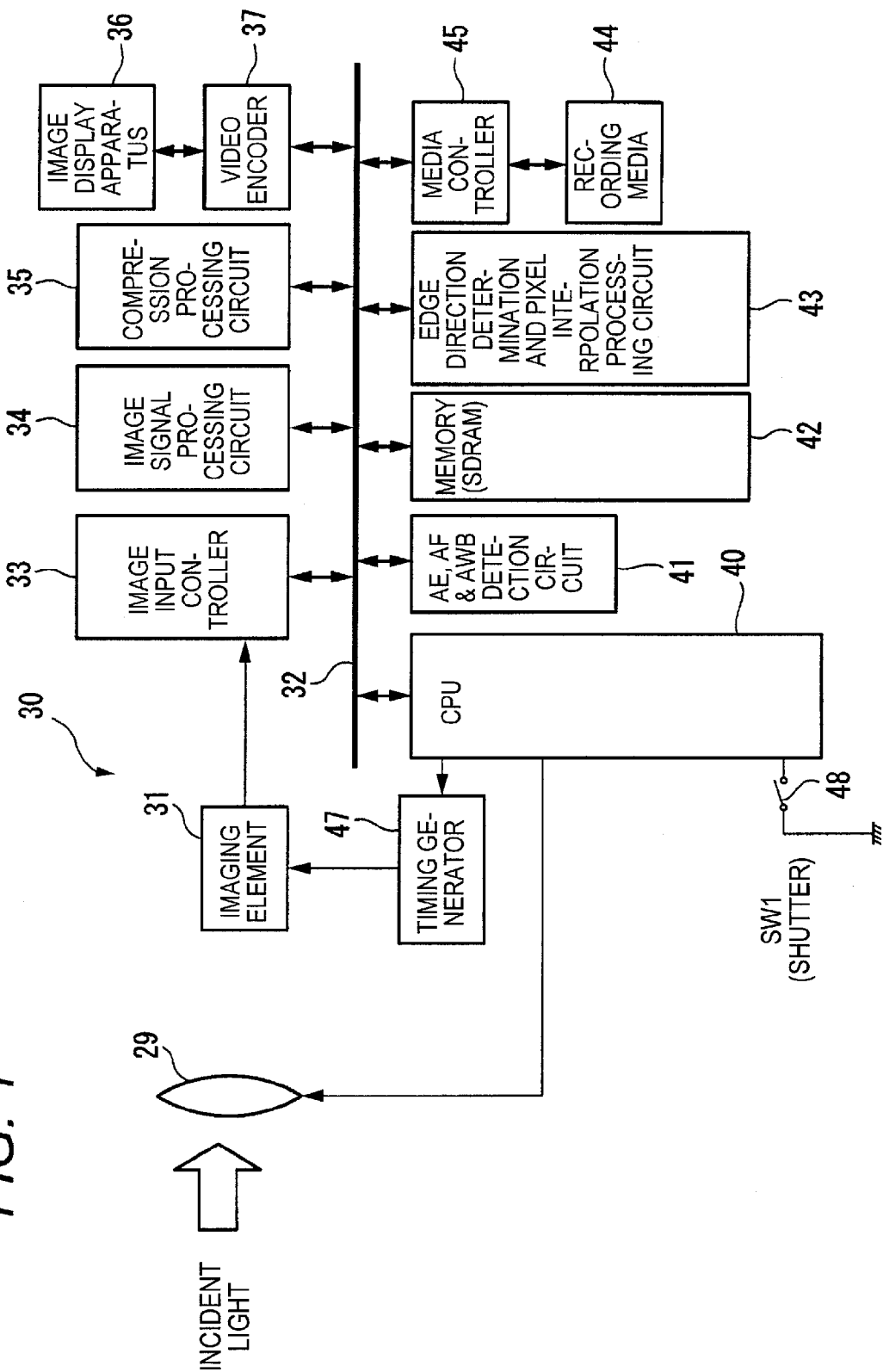
FIG. 1 is a functional block diagram of an imaging apparatus according to an exemplary embodiment of the present invention.

FIG. 1 is a functional block diagram of an imaging apparatus according to an exemplary embodiment of the present invention. For example, a CMOS-type imaging element 31 is placed in an imaging apparatus 30. A photographing lens 29 is placed at the front end of the imaging element 31. Further, there is provided an image input controller 33 that receives an output image signal of the imaging element 31 and outputs the received image signal to a bus 32. In addition, the imaging element 31 may be an imaging element of another type such as a CCD type.

An image signal processing circuit 34 that performs a known image processing of the output image signal of the imaging element 31, a compression processing circuit 35 that compresses the image signal after the image processing into JPEG image data, or the like, a video encoder 37 that displays a captured image or a through image (live view image) on an image display apparatus 36 installed on a rear surface of the imaging apparatus 30, or the like, a CPU 40 that integrally controls the imaging apparatus 30, a circuit 41 that detects an automatic exposure (AE), an automatic focus (AF), and an automatic white balance (AWB) by processing a signal output from the imaging element 31 as the through image, a main memory 42, a processing circuit 43 that acquires a captured image signal at a phase difference detection pixel position through pixel interpolation, and a media controller 45 that stores JPEG image data in a recording media 44 are connected to the bus 32.

The imaging element 31 is driven by a timing signal from a timing generator 47 and the timing generator 47 operates according to an instruction from the CPU 40. A focus lens position of the photographing lens 29 is also driven according to the instruction from the CPU 40. A recording instructing unit 49 is connected to the CPU 40.

Figure 2A:
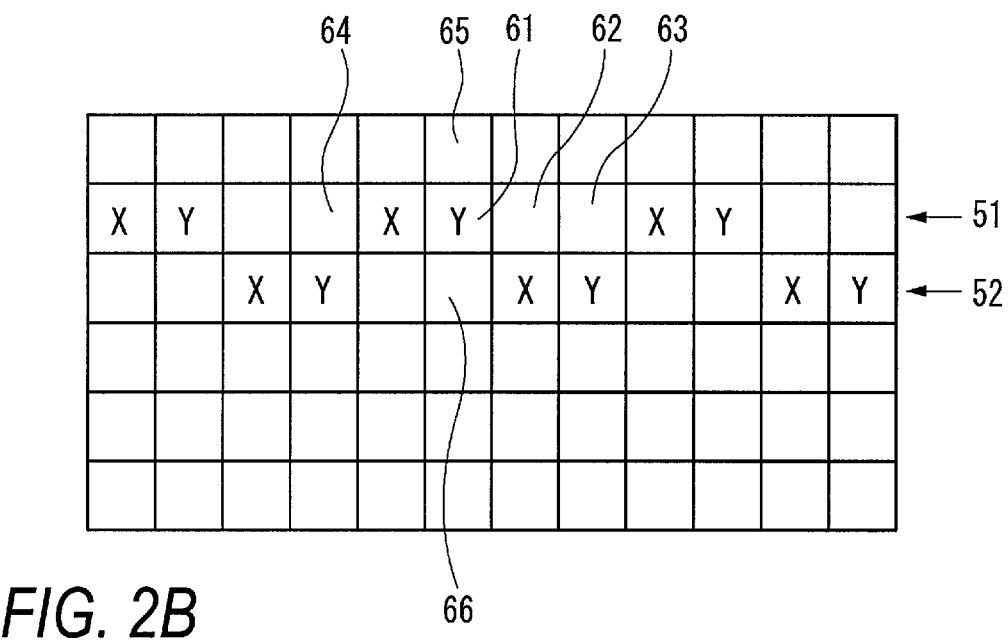
FIGS. 2A and 2B are views illustrating phase difference detection pixel layouts according to a first exemplary embodiment (FIG. 2A) and a second exemplary embodiment (FIG. 2B) of the present invention.
Figure 2B:
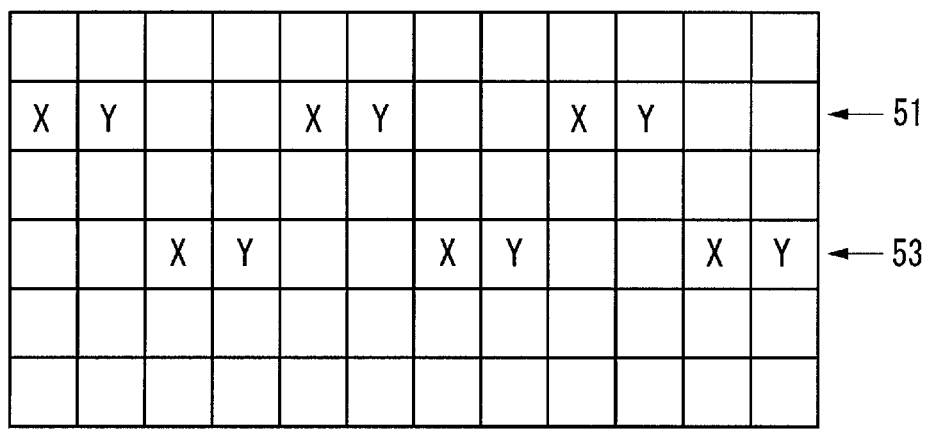
Figure 14A:
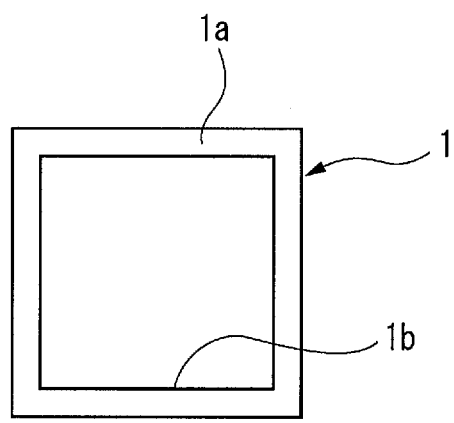
FIGS. 14A and 14B are explanatory views of a phase difference detection pixel.
Figure 14B:
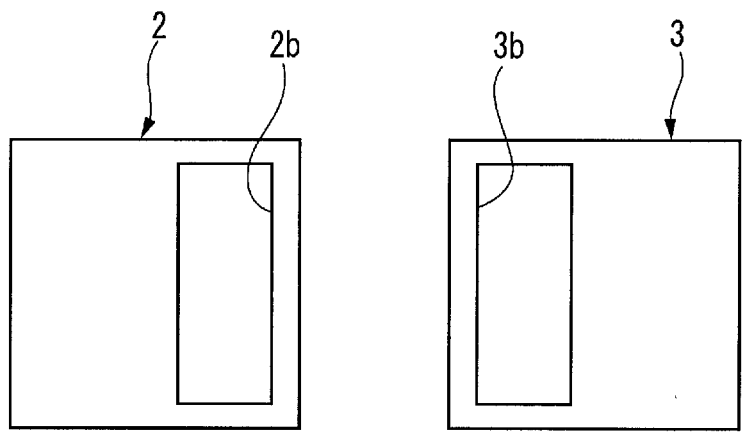

FIGS. 2A and 2B are explanatory views of a surface part of the imaging element 31. Hereinafter, in order to pike the figures easily seen, one pixel of each phase difference detection pixel pair described in FIG. 14B is marked by 'X' and the other one is marked by 'Y', and the ordinary pixels are illustrated only by rectangular frames.

In an exemplary embodiment illustrated in FIG. 2A, in a square lattice array, phase difference detection pixel pairs XY are placed alternately, on a predetermined horizontal row 51 and a horizontal row 52 vertically displaced from the horizontal row 51 by one row, at an one-pair interval and compactly without a gap in the horizontal direction. 'Without a gap' means that there is no gap between a predetermined pair pixel XY (particularly, pixel Y) on the horizontal row 51 and a pair pixel XY (particularly, pixel X) of the horizontal row 52 which is subsequent thereto (there is no vertical pixel column where a phase difference detection pixel is not present).

As such, for example, a captured image signal at a position of a predetermined phase difference detection pixel Y 61 may be interpolation-operated by using ordinary pixels 62, 63, 64, and the like which are positioned on the same horizontal row, thereby improving interpolation precision. Further, the interpolation-operation is, of course, performed by using upper and lower ordinary pixels 65, 66, and the like with a horizontal row being interposed therebetween.

Meanwhile, since the phase difference detection pixels XY are present compactly without a gap in the horizontal direction, when a difference between the horizontal rows 51 and 52 is disregarded, phase difference information detected in the phase difference detection pixel pairs XY may be detected while maintaining the resolution with high precision.

FIG. 2B illustrates an exemplary embodiment in which the phase difference detection pixel pairs XY are placed alternately on the horizontal row 51 and a horizontal row 53 vertically displaced from the horizontal row 51 by two rows, at one-pair intervals and compactly without a gap in the horizontal direction. Recently, as the imaging element 31, imaging elements having approximately 10 megapixels or higher as an embedded pixel count have been primarily used, but for example, in the recent imaging elements having 10 megapixels or higher, there is no influence even though the horizontal rows 51 and 53 are displaced from each other by approximately several pixels. As a result, distribution data (to be described below in FIG. 7) of high-resolution phase difference information may be obtained.

Further, 'in a pixel group within a predetermined area of the color imaging element, phase difference detection pixels are placed in all horizontal components' represents a state in which the phase difference pixels are arrayed in all horizontal component positions (pixel layout positions) in the predetermined area when the color imaging element is viewed in a vertical direction. That is, it refers to a state in which, as a result of moving the phase difference detection pixels on each vertical line in the vertical direction and rearranging the phase difference pixels in one horizontal row (for example, a third row), there is not even a gap of one pixel and phase difference detection pixels are placed entirely in the horizontal direction. For example, in any one of FIGS. 2A and 2B, the X pixels are formed at all the horizontal positions when it is disregarded that vertical placement positions are different from each other. Herein, a pixel group within a predetermined area includes a pixel group within a part of the entire pixel group placed in the imaging element, but the pixel group may be the pixel group in the entire area.

Similarly, 'in a pixel group within a predetermined area of the imaging element, the phase difference pixels are placed on all vertical components' represents a state in which phase difference detection pixels are arrayed at all vertical component positions (pixel placement positions) in a predetermined area in the case of horizontally viewing the imaging element. For example, it represents a state in which the state of FIG. 2A or 2B is rotated by 90°. Similarly, the pixel group within the predetermined area includes a pixel group within some areas in the entire pixel group placed in the imaging element, but the pixel group may be the pixel group in the entire area.

Figure 3:
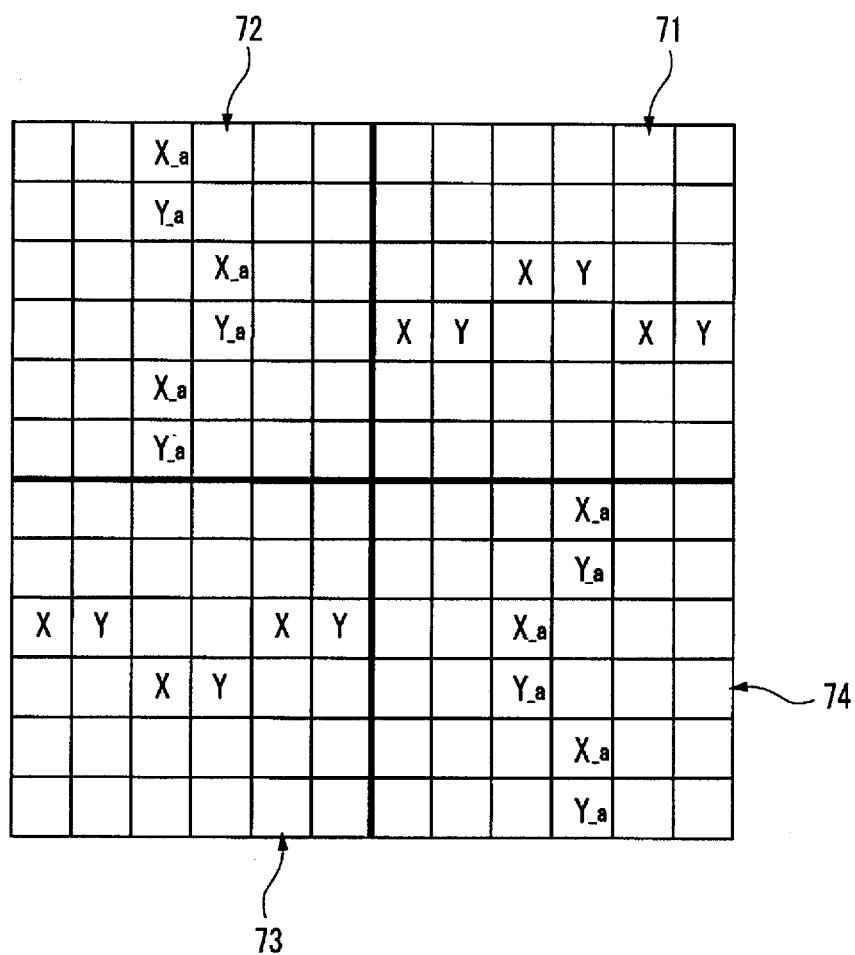
FIG. 3 is a view illustrating a phase difference detection pixel layout according to a third exemplary embodiment of the present invention.

The exemplary embodiment of FIG. 3 illustrates an imaging element that may acquire the distribution data of the horizontal phase difference information even though the imaging apparatus (camera) 30 of FIG. 1 is placed horizontally or vertically. In the imaging element 31 illustrated in FIGS. 2A and 2B, the positions of light blocking layer openings 2b and 3b of the phase difference detection pixel pair XY are eccentric in the horizontal direction and further, the phase difference detection pixel pair XY is arrayed in line in the horizontal direction, as illustrated in FIG. 4A.

As a result, when imaging is performed in a state where the camera is placed in the vertical direction, a displacement direction of the light blocking layer openings 2b and 3b becomes the vertical direction and further, an array direction of the phase difference detection pixel pair becomes the vertical direction. Then, only the distribution data of the vertical phase difference information may be obtained, and the distribution data of the horizontal phase difference information may not be obtained.

If the phase difference information is acquired only for focus detection, the distribution data of the vertical phase difference information may also be acceptable. However, in some cases, it may be desired to obtain the distribution data of the horizontal phase difference information even if the camera is placed in the vertical direction.

In the exemplary embodiment of FIG. 3, a pixel group of 12×12 pixels is divided into pixel groups 71, 72, 73, and 74 of 6×6 pixels, and, in two pixel groups 71 and 73 that are adjacent to each other in a diagonal direction, the phase difference detection pixel pairs XY are placed alternately on different horizontal rows, at one-pair intervals and compactly without a gap in the horizontal direction. In the remaining pixel groups 72 and 74, phase difference detection pixel pairs X_aY_a are placed alternately on different vertical columns, at one-pair intervals and compactly without a gap in the vertical direction. Herein, in the phase difference detection pixels X_aY_a, light blocking layer openings 2b__a and 3b__a are configured to be eccentric in the vertical direction when the camera is placed in the horizontal direction, as illustrated in FIG. 4B. As a result, when the camera 30 is placed in the vertical direction, the light blocking layer openings 2b__a and 3b__a are eccentric in the horizontal direction.

In the imaging element 31 illustrated in FIGS. 2A and 2B, the phase difference detection pixel pairs XY is arrayed in line horizontally. As a result, a center position of a predetermined pair XY and a center position of a pair XY horizontally adjacent thereto are horizontally spaced apart from each other by two pixels. For example, as illustrated in FIG. 5A, when pixels in a phase difference detection pixel pair XY are arrayed in the vertical direction and the phase difference detection pixel pairs XY are arrayed in the horizontal direction without a gap, a horizontal gap between the pair pixels and the pair pixels is equivalent to one pixel and the resolution of horizontal distribution data of the phase difference information is two times higher than that of FIGS. 2A and 2B.

Figure 15:
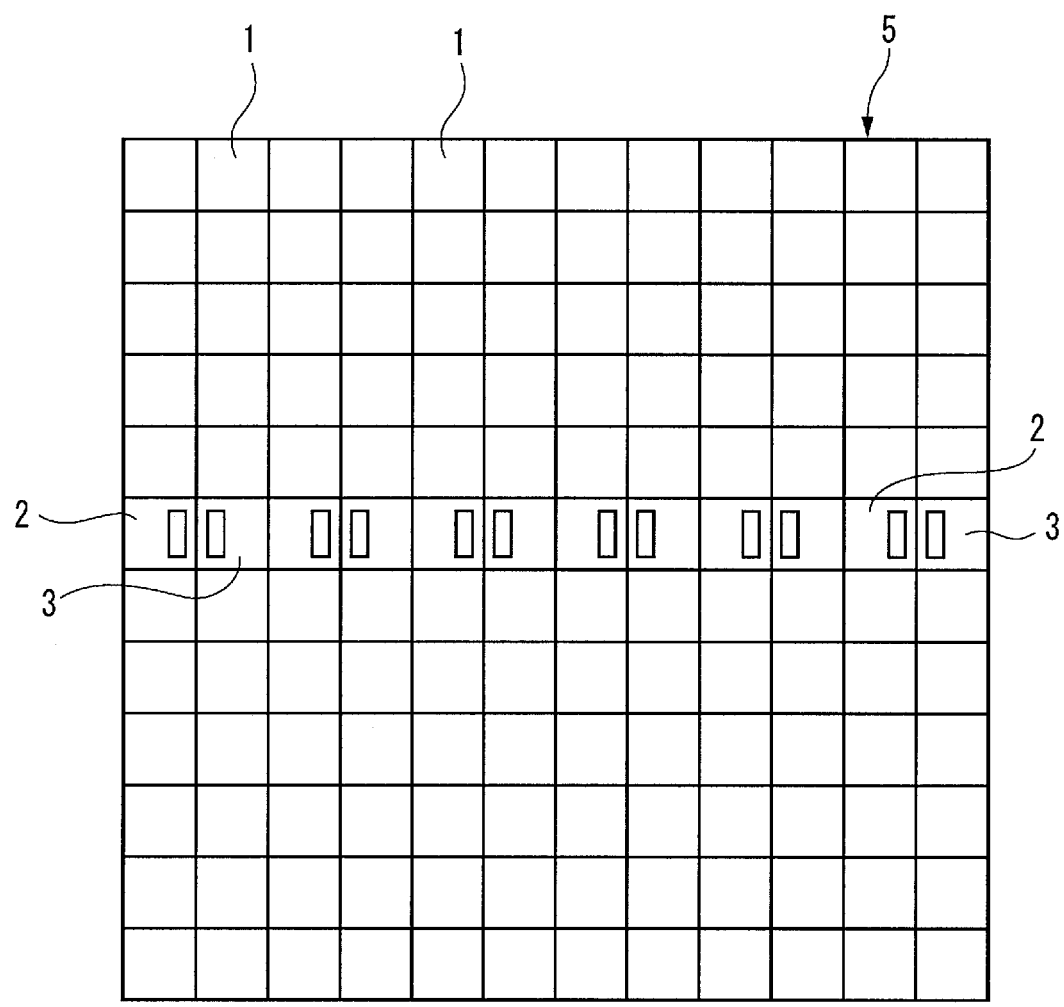
FIG. 15 is a view describing a layout of a phase difference detection pixel (focus detection pixel) in the related art.

However, as described with reference to FIG. 15 as an example, no ordinary pixel is placed on two horizontal rows one of which is provided with phase difference detection pixels X are provided and the other of which is provided with phase difference detection pixels Y, and as a result, the pixel interpolation precision of the captured image signal at the phase difference detection pixel position deteriorates.

Therefore, in the exemplary embodiment illustrated in FIG. 5B, the phase difference detection pixel pairs XY are provided throughout four horizontal rows 51, 52, 53, and 54 that are consecutive in the vertical direction. However, in a predetermined vertical column, a phase difference detection pixel X is provided on the horizontal row 51 and a phase difference detection pixel Y is provided on the horizontal row 52. In addition, in a vertical column adjacent to the predetermined vertical column, a phase difference detection pixel X is provided on the horizontal row 53, and a phase difference detection pixel Y is provided on the horizontal row 54, and in the next adjacent vertical column, a phase difference detection pixel X is provided on the horizontal row 51 and a phase difference detection pixel Y is provided on the horizontal row 52, again.

That is, when phase difference detection pixels X and Y that form a pair are arrayed in the vertical direction and phase difference detection pixels X and Y are consecutively arrayed in the horizontal direction, the pair pixels are alternately arrayed in the horizontal direction in two-pixel shifts in vertical position is shifted by two pixels. As a result, a space where one ordinary pixel is provided is secured between adjacent pair pixels in the horizontal direction, and as a result, a captured image signal at a phase difference detection pixel position may be precisely pixel-interpolated.

In the example of FIG. 5B, pair pixels XY are placed on the horizontal rows 51 and 52, the pair pixels are placed on the horizontal rows 53 and 54, and there is no gap between the horizontal rows 52 and 53. However, even if the pair pixels of the horizontal row 52 and the pair pixels of the horizontal row 53 are spaced apart from each other by approximately several pixels as described in the exemplary embodiment of FIG. 2B, the horizontal resolution of the phase difference information does not deteriorate.

Figure 6A:
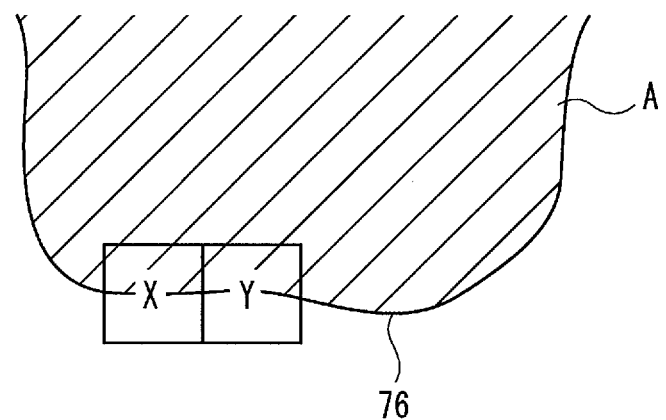
FIGS. 6A and 6B are explanatory views of determining an edge direction of an image by a layout direction of a phase difference detection pixel pair.
Figure 6B:
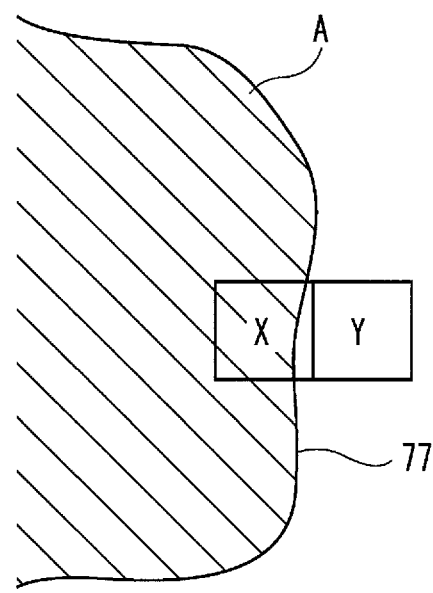

FIGS. 6A and 6B are views describing an operation function of the processing circuit 43 that performs edge direction determination and pixel interpolation illustrated in FIG. 1. Phase difference detection pixels X and Y that form a pair are placed in line in the horizontal direction.

In FIG. 6A, a hatched part is a subject image A and an edge 76 extends to cross both sides of the phase difference detection pixel pair XY. In this case, there is no difference between a detection signal of the phase difference detection pixel X and a detection signal of the phase difference detection pixel Y. As a result, it may be determined that the edge 76 extending in the array direction of the phase difference pixel pair AX is present at the position of the phase difference detection pixel pair XY.

In this regard, as illustrated in FIG. 6B, when the subject image A covers only the pixel X of the phase difference detection pixel pair XY which is placed in line in the horizontal direction, there is a large difference between the detection signal of the phase difference detection pixel X and the detection signal of the phase difference detection pixel Y. As a result, it may be determined that an edge 77 that crosses the array direction of the XY is present at the position of the phase difference detection pixel pair XY.

The processing circuit 43 that performs the edge direction determination and the pixel interpolation of FIG. 1 determines the edge direction according to whether the difference between the detection signal amounts of the phase difference detection pixels X and Y is equal to or larger than a predetermined value, as described above. In addition, according to a determination result, it is determined how the captured image signals at the positions of the phase difference detection pixels X and Y are corrected, as described below. Further, it may be determined how the captured image signals at the positions of the phase difference detection pixels X and Y are corrected based on a ratio rather than based on the difference.

As illustrated in FIG. 6A, when it is determined that the edge direction is the same as the array direction of the phase difference detection pixel pair XY, the difference between the detection signal of the pixel X and the detection signal of the pixel Y is small and a correlation is high. In this case, even if non-uniformity occurs between the detection signal of the pixel X and the detection signal of the pixel Y, an influence on the subject image is small. As a result, the processing circuit 43 obtains the captured image signal at the position of the pixel X through gain correction. Similarly, the processing circuit 43 obtains the captured image signal at the position of the pixel Y through the gain correction. Of course, although the captured image signals may be obtained through pixel interpolation, it is convenient to obtain the captured image signals through the gain correction and the processing speed may be increased.

The gain correction is performed by applying a correction gain to the detection signals of the phase difference detection pixels X and Y. As can be seen when comparing FIGS. 14A and 14B, dimensions of the light blocking layer openings 2b and 3b of the phase difference detection pixels X and Y are approximately ½ of the light blocking layer opening 1b of the ordinary pixel. That is, the amount of light incident on the phase difference detection pixels X and Y is half of that of the ordinary pixel. As a result, the detection signal amount of each of the phase difference detection pixels X and Y is doubled to set the detection signals to the captured image signals at the respective pixel positions.

As illustrated in FIG. 6B, when the image A is covered with the phase difference detection pixel X and the image A does not superimpose on the phase difference detection pixel Y, the captured image signals at the respective pixel positions are obtained through the pixel interpolation. In this case, as the ordinary pixel used when the captured image signal of the phase difference detection pixel X is calculated through the interpolation operation, the ordinary pixel at the phase difference detection pixel X side rather than the image A side, that is, the edge 77 is used. Similarly, as the ordinary pixel used when the captured image signal of the phase difference detection pixel Y is calculated through the interpolation operation, the ordinary pixel at the phase difference detection pixel Y side rather than at a side opposite to the image A, that is, the edge 77 is used. As a result, pixel interpolation in which the image quality is not broken becomes available.

Figure 7:
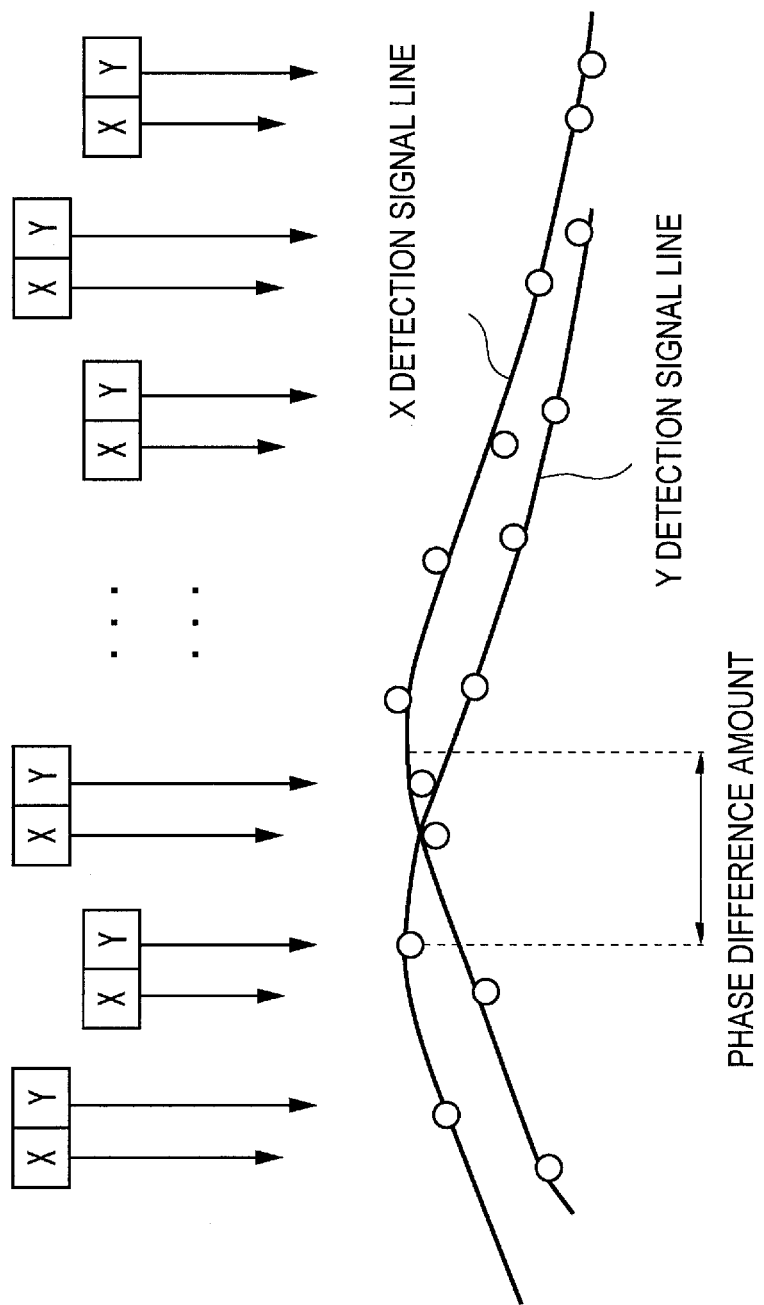
FIG. 7 is an explanatory view of horizontal distribution data of phase difference information.

FIG. 7 is a view exemplifying distribution data of phase difference information detected by the AF detection circuit 41 of FIG. 1. The phase difference detection pixel pairs XY arrayed on the horizontal rows 51 and 52 of FIG. 2A extend throughout two horizontal rows. Similarly in FIG. 2B, it may be thought that light emitted from a position on the same horizontal line in the subject is also incident on horizontal lines of the phase difference detection pixel pair XY.

In the phase difference detection pixel X, the light blocking layer opening 2b is eccentric to the right from the pixel center as can be seen from FIG. 4A. In this case, the light blocking layer opening 2b becomes an opening at a left eye side from the viewpoint of the pixel. On the contrary, the light blocking layer opening 3b of the phase difference detection pixel Y becomes an opening at a right eye side.

That is, an X detection signal line that connects detection signal values detected by the respective phase difference detection pixels X of the horizontal line and a Y detection signal line that connects detection signal values detected by the phase difference detection pixels Y of the horizontal line deviate from each other by a left-right disparity amount, that is, a phase difference amount when the same subject is viewed with left and right eyes. When the deviation amount (phase difference amount) is obtained, a distance up to the subject may be calculated.

Upon receiving the data of FIG. 7 from the AF detection circuit 41, the CPU 40 of FIG. 1 moves a focus lens position of the photographing lens 29 to a position where the subject is focused. By the movement, the deviation between two detection signal lines, i.e. the X detection signal line and the Y detection signal line of FIG. 7 is decreased and both the signals lines superimpose on each other at the focusing position. As such, AF processing is executed.

In the exemplary embodiments described above, the present invention has been described using a monochrome imaging element 31 for photographing an image so as to allow the main point of the present invention to be understood. However, the exemplary embodiments may also be applied to a single-plate type imaging element 31 for photographing a color image as they are.

Figures 8A, 8B, 8C, 8D:
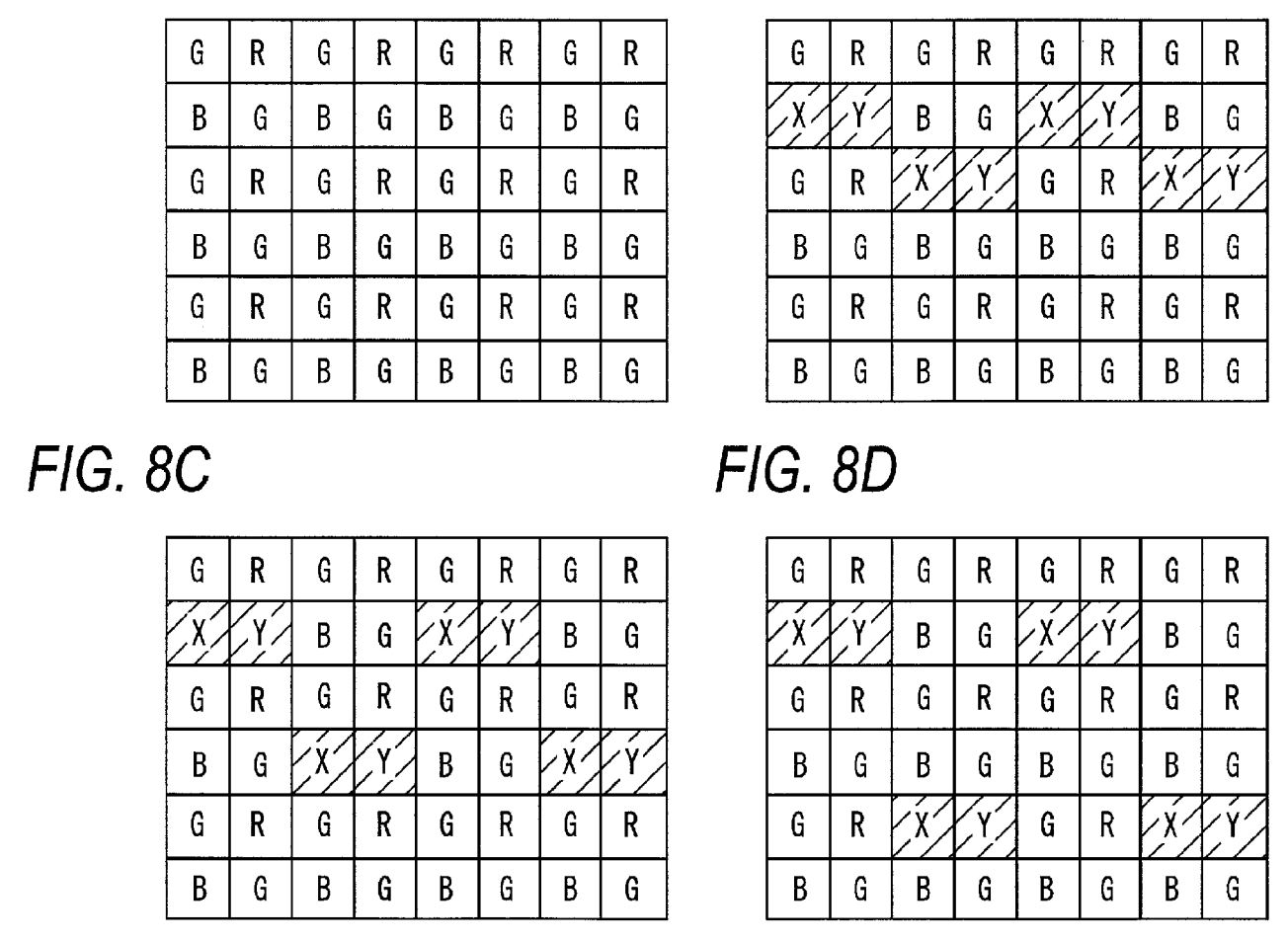

FIG. 8A illustrates a Bayer array in which a color filter array is conventional and FIG. 8B is an explanatory view in which the exemplary embodiment of FIG. 2A is applied to the color imaging element of the Bayer array. In the drawings, R indicates red filter, G indicates green filter, and B indicates blue filter. In addition, 'X' and 'Y' indicating the phase difference detection pixels are also illustrated, but the phase difference detection pixels X and Y are hatched for easy understanding. Further, a pixel with the R filter may be referred to as an R pixel. The same applies to the G filter and the B filter.

A phase difference detection pixel pair XY needs to be equipped with a concolorous, and phase difference detection pixels KY may be a color filter having a color (for example, an emerald color) different from RGB. Alternatively, the phase detection pixels may be equipped with a transparent filter rather than a color filter, or both pixels XY may be equipped with a color filter of G color.

In the example of FIG. 8B, pairs of the phase difference detection pixels X and Y are placed alternately on two vertically adjacent horizontal rows compactly without a gap in the horizontal direction, as described in FIG. 2A. In FIG. 8B, arrays, in which locations which are consecutive as BG are substituted with the phase difference detection pixel pair XY and then locations which are consecutive as GR are substituted with the phase difference detection pixel pair XY, are alternately repeated in the horizontal direction.

FIG. 8C illustrates an example in which the exemplary embodiment of FIG. 2B is applied to the color imaging element having the Bayer array. In this case, arrays, in which locations which are consecutive as BG are substituted with the phase difference detection pixel pair XY and then locations which are consecutive as BG below by two rows are substituted with the phase difference detection pixel pair XY, are alternately repeated in the horizontal direction.

In the case of this array example, the number of pixels equipped with the B filters is smaller than the number of pixels equipped with the R filters. Therefore, in a color filter array of a horizontal row adjacent to two horizontal rows where the phase difference detection pixel pair XY is provided, the R pixel is substituted with the B pixel, which is set as an area where the phase difference detection pixel pair XY is provided, thereby leading to approximately 'B pixel count=R pixel count'. Of course, on the contrary, when only the array part of the GR is substituted with the phase difference detection pixel pair XY, some of neighboring B pixels are set as the R pixels.

FIG. 8D is a view illustrating an example in which the horizontal row where the phase difference detection pixel pair XY is provided is vertically shifted by three rows, in the Bayer array. With separation of such a distance, there is no problem.

Figures 9A, 9B, 9C:
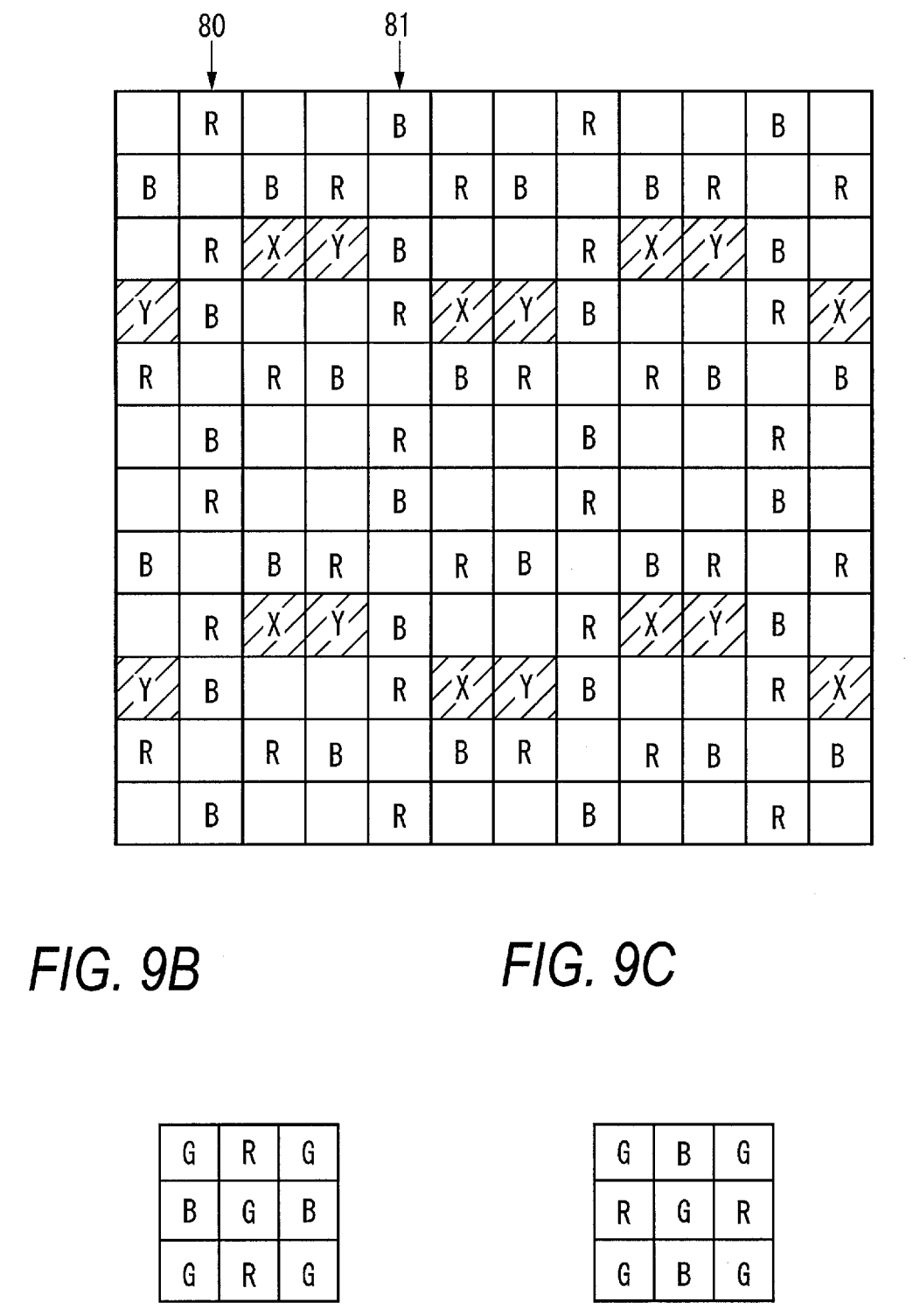

FIG. 9A is a view in which some pixels of a color imaging element having a separate color filter array are substituted with the phase difference detection pixels X and Y. A blank rectangular frame is the G pixel, but the indication of 'G' is omitted so as to make the figure easily seen.

The color filter array is formed by alternately arraying a first array of FIG. 9B and a second array of FIG. 9C in both the horizontal direction and the vertical direction.

The first array is configured such that 5 pixels which are the total pixels at the center and 4 corners in a pixel group of 3×3 pixels are set as G filters, 2 pixels of the same pixel column among 4 pixels other than the 5 pixels are set as the R filters, and the remaining 2 pixels are set as the B filters. Further, an array pattern in which 2 pixels of the same pixel row among the 4 pixels are set as the R filters and the remaining 2 pixels are set as the B filters becomes the second array.

When the first array and the second array illustrated in FIGS. 9B and 9C are alternately arrayed in line in the horizontal direction and the vertical direction, locations where four G pixels are formed as one lump are formed at discrete and periodic positions. Two horizontal pixels among the four pixels are substituted with the phase difference detection pixel pair XY, and as a result, the color imaging element of FIG. 9A is formed. The imaging element has a pixel group of 6×6 pixels having the phase difference detection pixels XY as a basic pattern and has a shape in which the basic pattern is arrayed in line in the horizontal direction and the vertical direction.

The example of FIG. 9A has a structure in which the phase difference detection pixel XY is not placed in vertical pixel columns 80, 81 or the like. However, in a recent imaging element in which multi-pixelating has progressed, vertical pixel columns without a phase difference detection pixel are present. Thus, that does not matter so much when the number of the vertical pixel columns is small horizontal phase difference information of high resolution may be acquired.

The color imaging element of FIG. 9A is formed by alternately repeating the first array of FIG. 9B and the second array of FIG. 9C in both the horizontal direction and the vertical direction, but may have a color filter array in which only the first array is repeated in the horizontal direction and vertical direction. A color filter array, in which only the second array is repeated in the horizontal and vertical directions, may be acceptable. In this case, since locations where G filters exist are not changed, locations substituted with the phase difference detection pixels X and Y are the same as those of FIG. 9A.

Figures 10A, 10B, 10C:
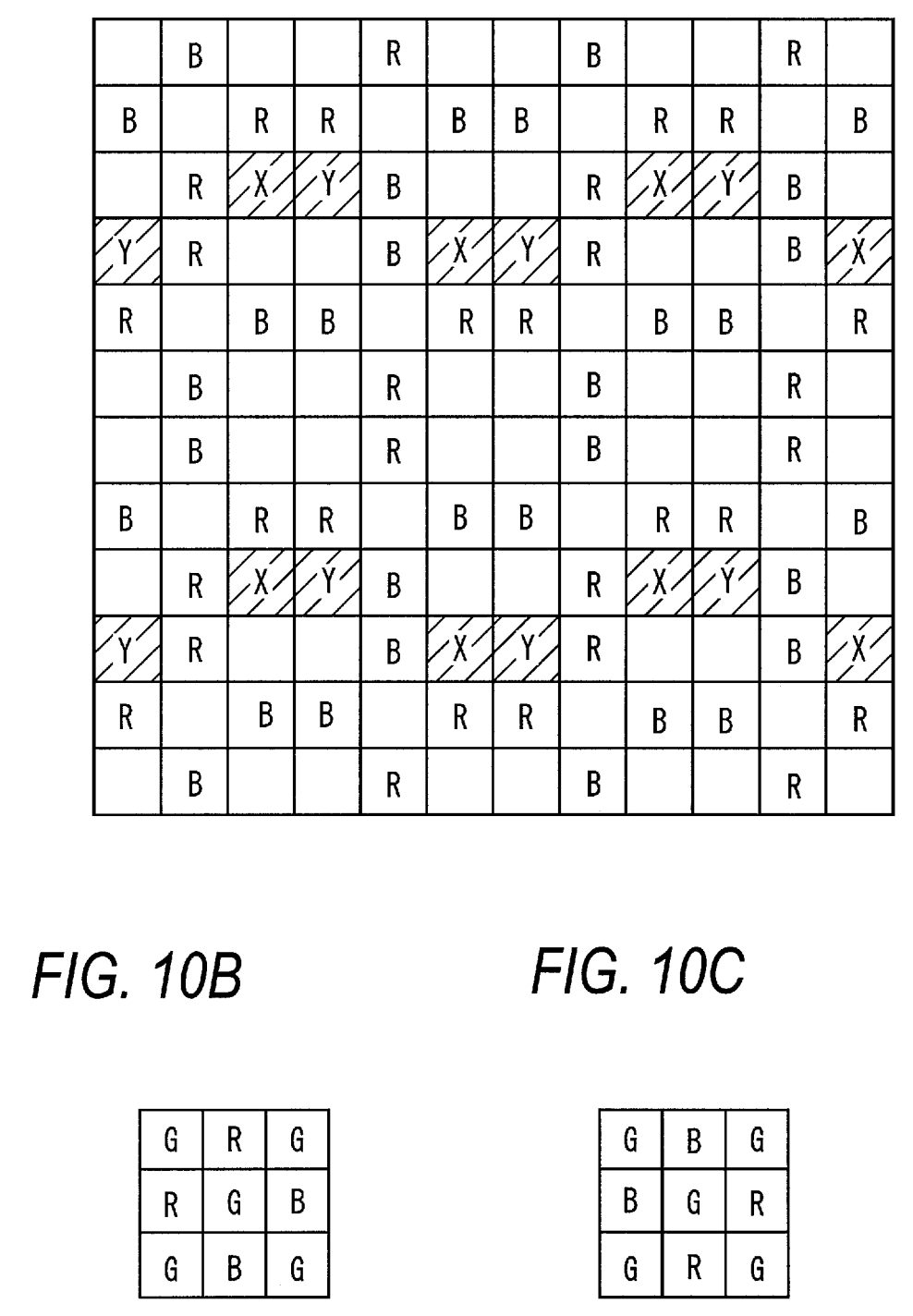

FIG. 10A is a view illustrating a modified example of the color filter array of FIG. 9A. Similarly as FIG. 9A, the phase difference detection pixel pair XY is placed at a location in which 4 G pixels are formed as one lump. The color filter array of FIG. 10A is formed by alternately placing the first array of FIG. 10B and the second array of FIG. 10C in the horizontal direction and the vertical direction.

The first array is configured so that 5 pixels which are the total pixels at the center and 4 corners in the pixel group of the 3×3 pixels are set as the G filters, and 4 pixels other than the 5 pixels are divided into two parts, in each of which 2 pixels are adjacent to each other, to set 2 pixels in one part as the R filters and 2 pixels at the other part as the B filters. The second array is configured by setting the 2 pixels in one part as the B filters and the 2 pixels in the other part as the R filters.

In addition, the color filter array of FIG. 9B may be changed to the color filter array of FIG. 10B to provide a color filter array, in which only the first array or only the second array is arrayed in the horizontal direction and the vertical direction as described above.

Figures 11A, 11B:
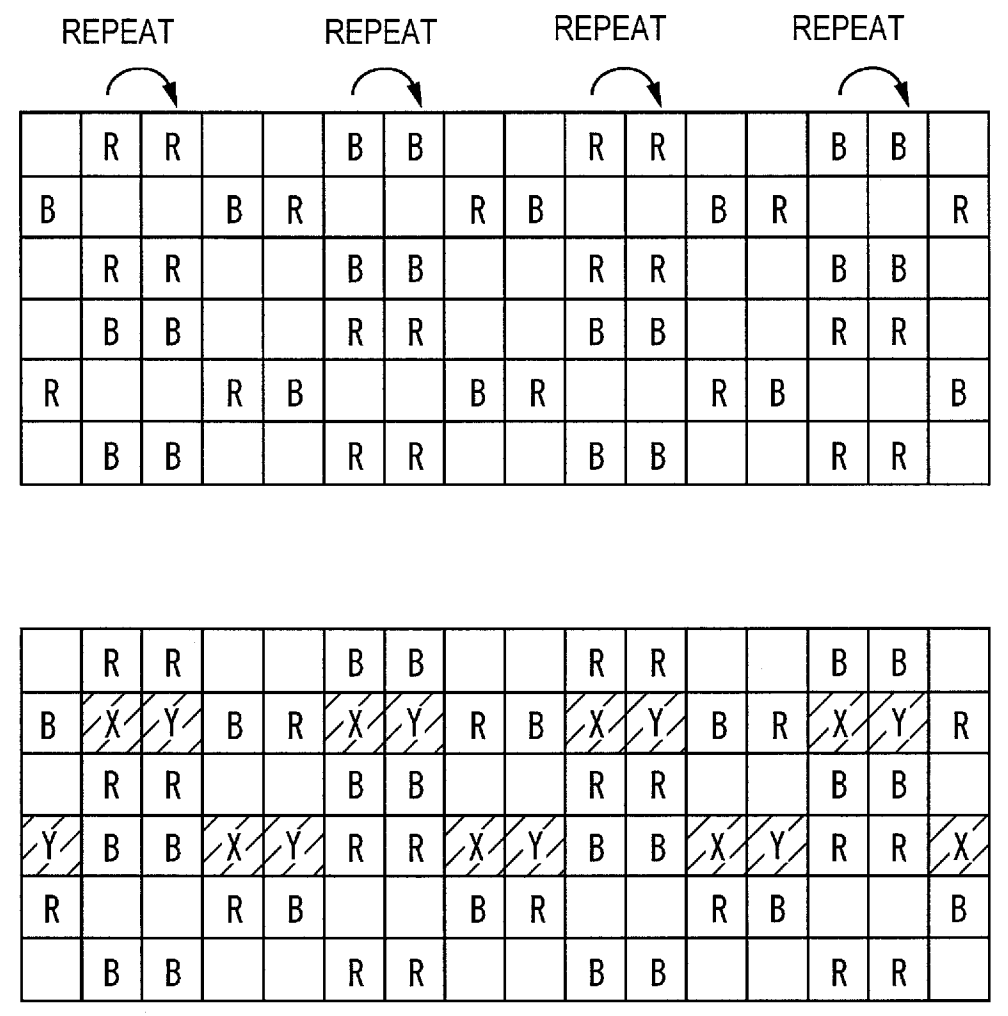

FIG. 11A is an explanatory view of another color filter array. When the phase difference detection pixels X and Y are provided in the color filter arrays of FIGS. 9A and 10A, there is provided a structure in which the phase difference detection pixel may not be provided in the pixel columns 80, 81, or the like of FIG. 9A. That is, there is provided a structure in which a pixel column, in which two G pixels are not horizontally consecutive, is present. However, when the color filter array of FIG. 11A is provided, it becomes possible to provide the phase difference detection pixels in all of the vertical pixel columns.

The color filter array of FIG. 11A is based on the color filter array of FIG. 9B. Since it is equal to that in FIG. 10B or in the color filter array using only the first array or only the second array, descriptions will be made using FIG. 9A.

The color filter array of FIG. 11A may be formed by making a filter constitution of the vertical pixel column 80 of FIG. 9A consecutive in the horizontal direction in each two adjacent columns, making a filter constitution of the vertical pixel column 81 consecutive in the horizontal direction in each two adjacent columns, and so on. As a result, as illustrated in FIG. 11B, all of the G pixels are consecutive by two pixels in the horizontal direction and the exemplary embodiment of FIG. 2A or FIG. 2B may be applied. FIG. 11B is a view to which the exemplary embodiment of FIG. 2B is applied.

Although the present invention may be suitably applied to the color filter arrays illustrated in FIGS. 9A to 11B, the present invention is not exclusively limited to the color filter arrays but may be applied when color filters satisfy the following conditions. That is, (1) the color filter array is a color filter array which is arrayed on pixels square-lattice-arrayed in the horizontal direction and the vertical direction of the single-plate type color imaging element, (2) the color filter array includes a predetermined basic array pattern in which a first filter corresponding to a first color (for example, green) that contributes most to acquiring a luminance signal and second filters corresponding to two or more second colors (for example, blue and red) other than the first color are arrayed, (3) the basic array pattern is repeatedly placed in the horizontal direction and the vertical direction, (4) the first filter is placed in each line of horizontal, vertical, and oblique (diagonal) lines of the color filter array, (5) one or more second filters are placed in each line of the horizontal and vertical lines of the color filter array in the basic array pattern, and (6) the proportion of the number of pixels for the first color corresponding to the first filter is larger than the proportion of the number of pixels for each color of the second colors corresponding to the second filters.

According to the color imaging element that satisfies the above-described conditions, since the first filter corresponding to the first color that contributes most to acquiring the luminance signal is placed in each line of the horizontal, vertical, and oblique lines of the color filter array, reproduction precision of synchronization (interpolation) processing (also referred to as de-mosaic processing) in a high-frequency area may be improved and further, since one or more second filters corresponding to two or more second colors other than the first color are placed in each line of the horizontal and vertical directions of the color filter array, generation of color Moiré (false color) may be suppressed to achieve high resolution.

In the color filter array, since a predetermined basic array pattern is repeatedly placed in the horizontal direction and the vertical direction, when the synchronization processing (interpolation) processing (also referred to as de-mosaic processing) is performed at a latter stage, the processing may be performed according to a repetition pattern, and as a result, the latter stage processing may be simplified as compared to a random array in the related art.

Since the proportion of a pixel number for the first color corresponding to the first filter and the proportion of a pixel number for each color of the second colors corresponding to the second filters are made to be different from each other, in particular, since the proportion of the pixel number for the first color that contributes most to acquiring the luminance signal is larger than the proportion of the pixel number for each color of the second colors corresponding to the second filters, aliasing may be suppressed and high-frequency reproducibility may also be improved.

Preferably, the color filter array may include a part where the first filters are consecutive over two or more pixels in each line of the horizontal, vertical, and oblique lines. As a result, a direction (a direction having a high correlation) which is small in change of luminance in the horizontal, vertical, and oblique directions may be determined with a minimum pixel interval.

The color filter array may include a square array corresponding to 2×2 pixels constituted by the first filters. The direction having the high correlation among the horizontal, vertical, and oblique directions may be determined by using pixel values of the 2×2 pixels.

More preferably, color filter arrays in a predetermined basic array pattern may be point-symmetric to each other around the center of the basic array pattern. As a result, it is possible to reduce a circuit scale of the processing circuit at the latter stage.

More preferably, in the color filter array, the first filters may be placed at the center and four corners in the pixel group of 3×3 pixels and the pixel group of the 3×3 pixels is repeatedly placed in the horizontal direction and the vertical direction. Since the first filters are placed at four corners in the pixel group, when the pixel group is repeatedly placed in the horizontal direction and the vertical direction, the color filter array includes a square array corresponding to 2×2 pixels constituted by the first filters. The direction having the higher correlation among the horizontal, vertical, and oblique directions may be determined by using the pixel values of the 2×2 pixels and further, the first filters may be placed in each line of the horizontal, vertical, and oblique lines of the color filter array.

More preferably, the second filters may be placed in each line of the horizontal, vertical, and oblique lines of the color filter array. As a result, oblique color reproducibility may be further improved.

FIG. 12 is a view illustrating an example in which the phase difference detection pixels X and Y are provided in another color filter array. In the color filter array of FIG. 12, G pixel lumps each of which is constituted by four pixels are arrayed on the surface part of the imaging element in a checkerboard pattern and four pixel lumps at remaining checkerboard positions are diagonally divided two pixels by two pixels and one side is set as R pixels and the other side is set as B pixels. In the example of FIG. 12, the exemplary embodiment of FIG. 2B is applied to the color filter array. Of course, the exemplary embodiment of FIG. 2A is also applicable.

Figure 13:
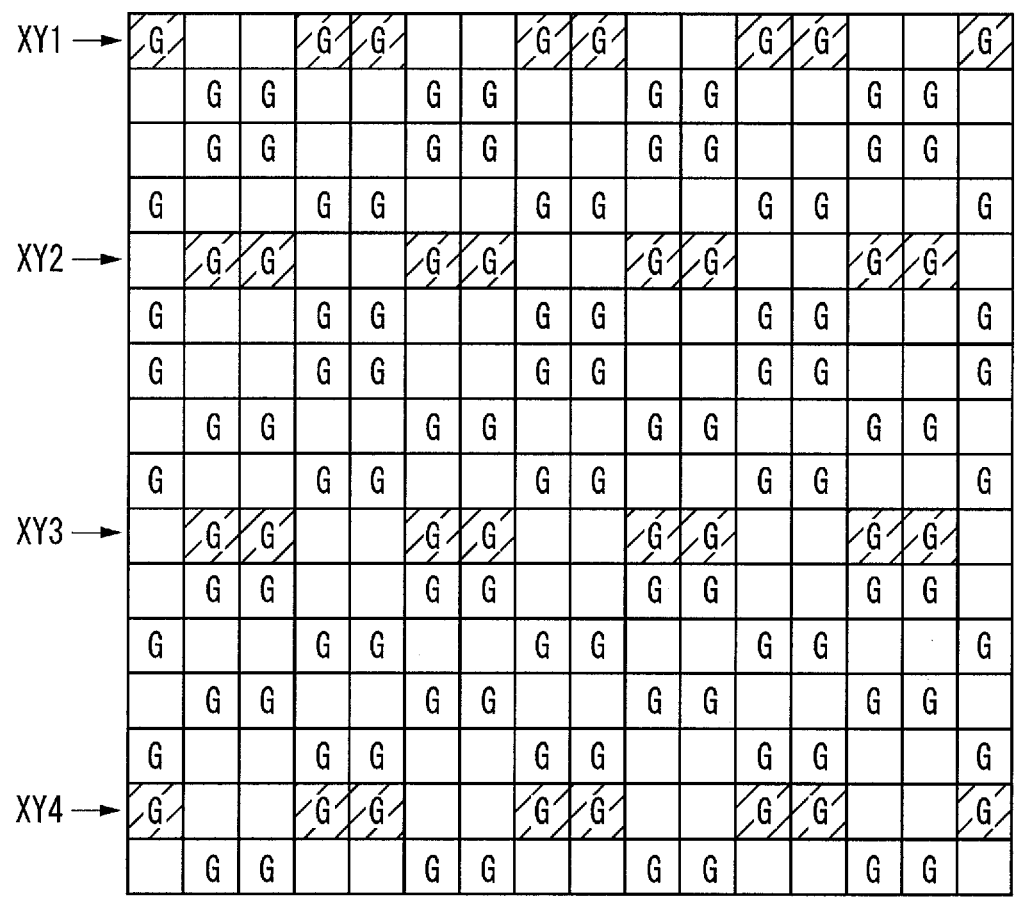

FIG. 13 is a view illustrating an example in which phase difference detection pixels are provided in another color filter array. In FIG. 13, blank rectangular frames correspond to B pixels or R pixels, and only the G pixel parts are marked by 'G'. The frames marked with hatching 'G' are the frames in which G pixels at the positions thereof are set as the phase difference detection pixels XY.

In the color filter array, four pixel lumps of the G pixel and a lump in which two G pixels are consecutive in the horizontal direction are discretely and periodically arrayed on the surface part of the imaging element. In the figure, in a horizontal row of an XY1 line and a horizontal row of an XY2 line, in which every two pixels of G pixels form one lump, when the two pixels of the lump are set as a pair of the phase difference detection pixels XY, it is possible to array phase difference detection pixels XY compactly without a gap in the horizontal direction.

In addition, in a horizontal row of an XY3 line and a horizontal row of an XY4 line in the figure, in which every four pixels of G pixels form one lump, when two horizontal pixels in the lump are set as a pair of phase difference detection pixels XY, it is also possible to array the phase difference detection pixels XY compactly without a gap in the horizontal direction.

The exemplary embodiments of FIGS. 8A to 13 correspond to examples in which the exemplary embodiment of FIGS. 2A and 2B is applied to various color filter arrays. Of course, however, the exemplary embodiments of FIGS. 3, 5A and 5B may also be applied to the color imaging element.

According to the exemplary embodiments described above, when the phase difference detection pixel pairs are arrayed in a direction to detect the phase difference information, the phase difference detection pixel pairs are consecutively arrayed, preferably, without a gap so that the density is increased in the direction. As a result, the high-resolution phase difference information may be acquired.

As discussed above, the exemplary embodiments discloses an imaging element in which pixels which are photoelectric conversion elements are placed at respective square lattice positions where a plurality of horizontal lines and a plurality of vertical lines cross each other, in which, when, in a predetermined region where pixels of the imaging element are placed, a plurality of pairs are arranged in a first line which is any one line among the lines and a second line which is parallel to the first line, each pair having pair pixels which are first and second phase difference detection pixels placed adjacent to each other to detect a phase difference among the pixels of the imaging element, the pairs in the first line are placed to be spaced apart from each other by at least two pixels, and the pairs in the second line are placed at positions, which correspond to positions where the pair pixels in the first line are spaced apart from each other.

The exemplary embodiments discloses the imaging element, in which the pair pixels are equipped with color filters having the same color.

The exemplary embodiments discloses the imaging element, in which the same color is green.

The exemplary embodiments discloses the imaging element, in which pixel groups of 2×2 pixels, which are equipped with the green color filters, are provided at discrete and periodic positions and the pair pixels are provided in the pixel groups of 2×2 pixels.

The exemplary embodiments discloses the imaging element, in which array patterns, in each of which total five pixels at a center and four corners of a pixel group of 3×3 pixels are set as the green color filters and two pixels among four pixels other than the five pixels are set as red color filters and two remaining pixels are set as blue color filters, are repeatedly placed in both a horizontal direction and a vertical direction.

The exemplary embodiments discloses the imaging element, in which array patterns, in each of which the total five pixels at the center and four corners of the pixel group of 3×3 pixels are set as the green color filters, and two pixels on the same vertical line among four pixels other than the five pixels are set as the red color filters and the two remaining pixels are set as the blue color filters, are set as first arrays, array patterns, in each of which two pixels on the same horizontal line among the four pixels are set as the red color filters and the two remaining pixels are set as the blue color filters, are set as second arrays, and the first arrays and the second arrays are alternately placed in both the horizontal direction and the vertical direction.

The exemplary embodiments discloses the imaging element, in which an array pattern is set as a first array, in which the total five pixels at the center and four corners of the pixel group of 3×3 pixels are set as the green color filters, four pixels other the five pixels are divided into two part, each of which includes two pixels obliquely adjacent to each other, and two pixels in one part are set as the red color filters and two pixels at the other part are set as the blue color filters, an array pattern is set as a second array pattern, in which the two pixels at the one part are set as the blue color filters and the two pixels in the other part are set as the red color filters, and the first array and the second array are alternately placed in both the horizontal direction and the vertical direction.

The exemplary embodiments discloses the imaging element, in which in a pixel group within a predetermined area of the imaging element, the phase difference detection pixels are placed on all horizontal components or on all vertical components.

The exemplary embodiments discloses an imaging apparatus equipped with the imaging element, the imaging apparatus comprising: a pixel interpolating unit that obtains a captured image signal at a position of a phase difference detection pixel by pixel-interpolating captured image signals of pixels other than the phase difference detection pixel, adjacent to the phase difference detection pixel.

The exemplary embodiments discloses the imaging apparatus, further comprising: a direction determining unit that determines an edge direction in a subject captured image by using a first signal value detected by a first phase difference detection pixel and a second signal value detected by a second phase difference detection pixel that constitutes the pair pixels.

The exemplary embodiments discloses the imaging apparatus, further comprising: the direction determining unit determines the edge direction from a difference or a ratio of the first signal value and the second signal value.

The exemplary embodiments discloses the imaging apparatus, further comprising: a control unit that allows the pixel interpolating unit to perform the pixel interpolation using a captured image signal of a pixel other than a phase difference detection pixel, at a position which is not over the edge when the direction determining unit determines the direction of the edge.

The exemplary embodiments discloses the imaging apparatus, further comprising: a gain correcting unit that gain-corrects a detection signal of the phase difference detection pixel constituting the pair pixels to set the gain-corrected detection signal as the captured image signal at the phase difference detection pixel position when the direction determining unit determines that a placement direction of the pair pixels detecting the edge and the direction of the edge are the same as each other.

The exemplary embodiments discloses the imaging apparatus, further comprising: an AF processing unit that performs AF processing using the detection signal of the phase difference detection pixel.

According to the exemplary embodiments described above, since a plurality of phase difference detection pixel pairs are not consecutively arrayed on the same line, a captured image signal at the phase difference detection pixel position may be subjected to pixel supplementation using a captured image signal of ordinary pixels adjacent to the phase difference detection pixels. As a result it is possible to capture a high-quality subject image.

The imaging element according to the present invention may perform pixel-interpolation of a captured image signal at a phase difference detection pixel position with high precision, in addition to performing a focusing control of a photographing lens up to, for example, a subject. Thus, the imaging element may be usefully applied to a digital still camera, a digital video camera, an imaging apparatus of a camera attached cellular phone, and the like. This application is based on Japanese Patent Application No. 2011-288033 filed on Dec. 28, 2011, the entire contents of which are incorporated herein by reference.

What is claimed is:

1. An imaging element in Which pixels which are photoelectric conversion elements are placed at respective square lattice positions where a plurality of horizontal lines and a plurality of vertical lines cross each other, wherein, when, in a predetermined region where pixels of the imaging element are placed, a plurality of pairs are arranged in a first line which is any one line among the lines and a second line which is parallel to the first line, each pair having pair pixels which are first and second phase difference detection pixels placed adjacent to each other, the first and second phase difference detection pixels are phase difference detection pixels detecting a phase difference among the pixels of the imaging element, the pairs in the first line are placed to be spaced apart from each other by at least two pixels, and the pairs in the second line are placed at positions, which correspond to positions where the pair pixels in the first line are spaced apart from each other.

2. The imaging element of claim 1, wherein the pair pixels are equipped with color filters having a same color.

3. The imaging element of claim 2, wherein the same color is green.

4. The imaging element of claim 3, wherein pixel groups of 2×2 pixels, which are equipped with the green color filters, are provided at discrete and periodic positions and the pair pixels are provided in the pixel groups of 2×2 pixels.

5. The imaging element of claim 4, wherein array patterns, in each of which total five pixels at a center and four corners of a pixel group of 3×3 pixels are set as the green color filters and two pixels among four pixels other than the five pixels are set as red color filters and two remaining pixels are set as blue color filters, are repeatedly placed in both a horizontal direction and a vertical direction.

6. The imaging element of claim 5, wherein array patterns, in each of which the total five pixels at the center and four corners of the pixel group of 3×3 pixels are set as the green color filters, and two pixels on the same vertical line among four pixels other than the five pixels are set as the red color filters and the two remaining pixels are set as the blue color filters, are set as first arrays, array patterns, in each of which two pixels on the same horizontal line among the four pixels are set as the red color filters and the two remaining pixels are set as the blue color filters, are set as second arrays, and the first arrays and the second arrays are alternately placed in both the horizontal direction and the vertical direction.

7. The imaging element of claim 5, wherein an array pattern is set as a first array, in which the total five pixels at the center and four corners of the pixel group of 3×3 pixels are set as the green color filters, four pixels other the five pixels are divided into two part, each of which includes two pixels obliquely adjacent to each other, and two pixels in one part are set as the red color filters and two pixels at the other part are set as the blue color filters, an array pattern is set as a second array pattern, in which the two pixels at the one part are set as the blue color filters and the two pixels in the other part are set as the red color filters, and the first array and the second array are alternately placed in both the horizontal direction and the vertical direction.

8. The imaging element of claim 1, wherein in a pixel group within a predetermined area of the imaging element, the phase difference detection pixels are placed on all horizontal components or on all vertical components.

9. An imaging apparatus equipped with the imaging element of claim 1, the imaging apparatus comprising:
a pixel interpolating unit that obtains a captured image signal at a position of a phase difference detection pixel by pixel-interpolating captured image signals of pixels other than the phase difference detection pixel, adjacent to the phase difference detection pixel.

10. The imaging apparatus of claim 9, further comprising:
a direction determining unit that determines an edge direction in a subject captured image by using a first signal value detected by a first phase difference detection pixel and a second signal value detected by a second phase difference detection pixel that constitutes the pair pixels.

11. The imaging apparatus of claim 10, further comprising:
the direction determining unit determines the edge direction from a difference or a ratio of the first signal value and the second signal value.

12. The imaging apparatus of claim 10, further comprising:
a control unit that allows the pixel interpolating unit to perform the pixel interpolation using a captured image signal of a pixel other than a phase difference detection pixel, at a position which is not over the edge when the direction determining unit determines the direction of the edge.

13. The imaging apparatus of claim 10, further comprising:
a gain correcting unit that gain-corrects a detection signal of the phase difference detection pixel constituting the pair pixels to set the gain-corrected detection signal as the captured image signal at the phase difference detection pixel position when the direction determining unit determines that a placement direction of the pair pixels detecting the edge and the direction of the edge are the same as each other.

14. The imaging apparatus of claim 9, further comprising:
an AF processing unit that performs AF processing using the detection signal of the phase difference detection pixel.

* * * * *